United States Patent Office 3,077,939
Patented Feb. 19, 1963

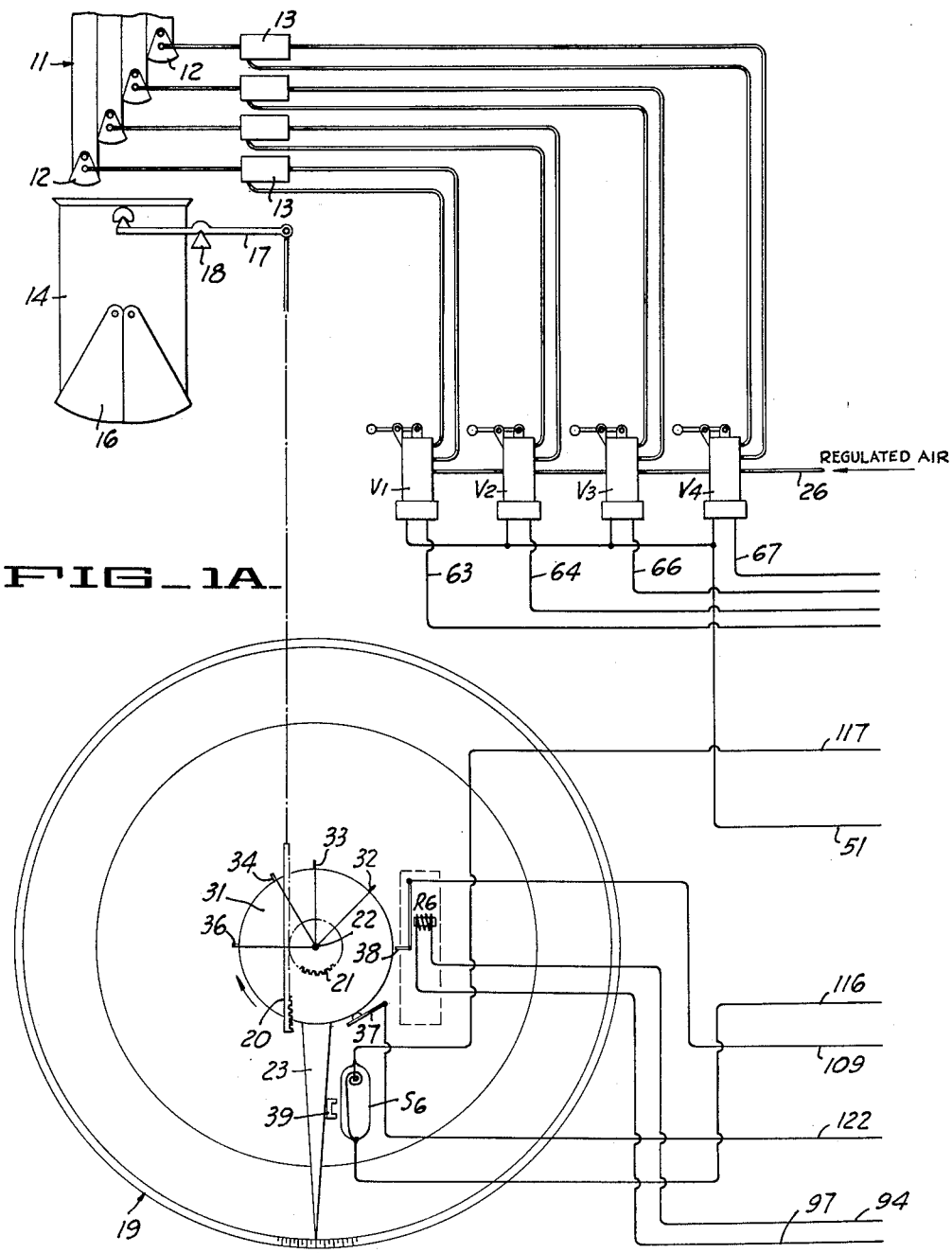

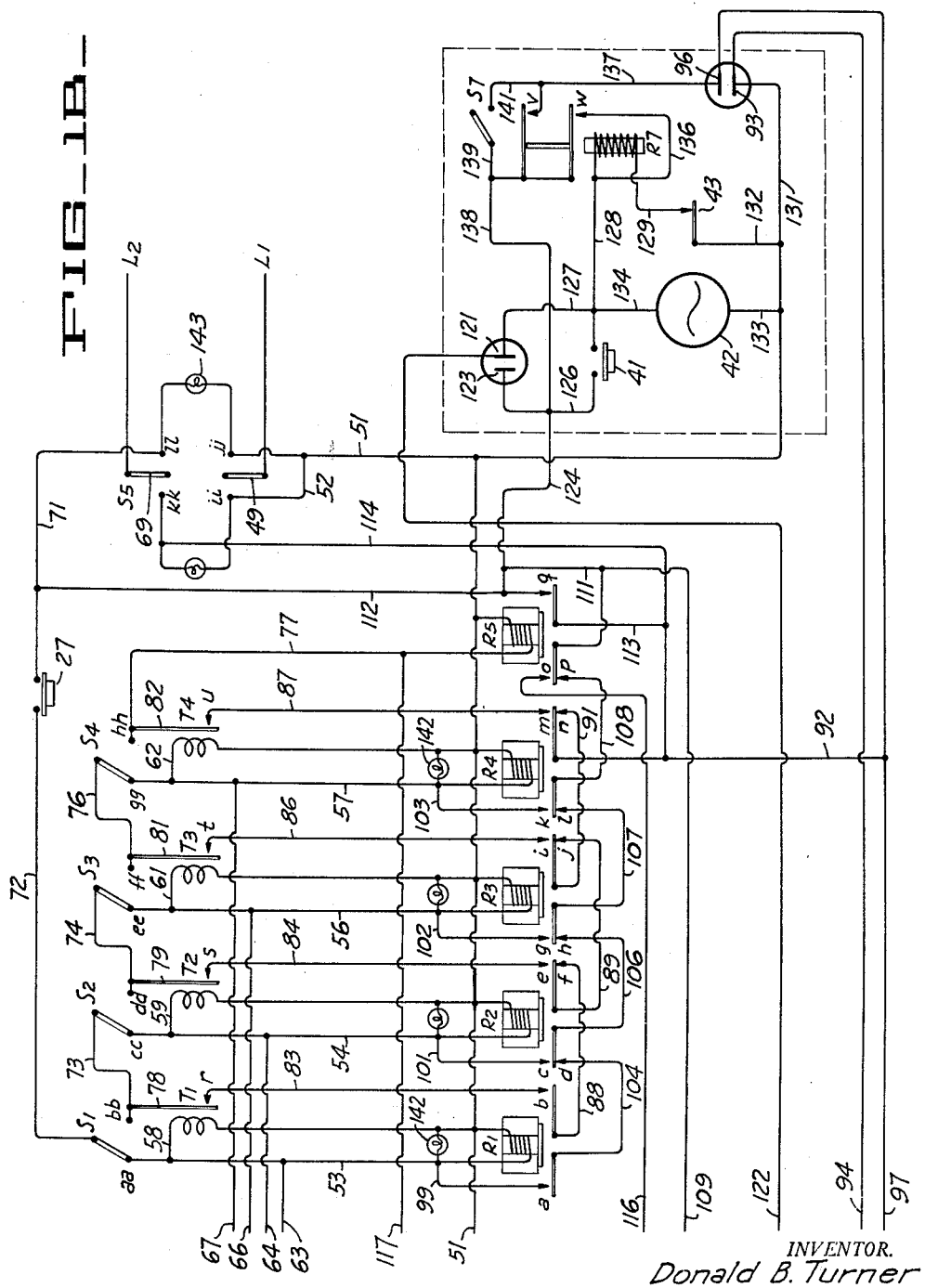

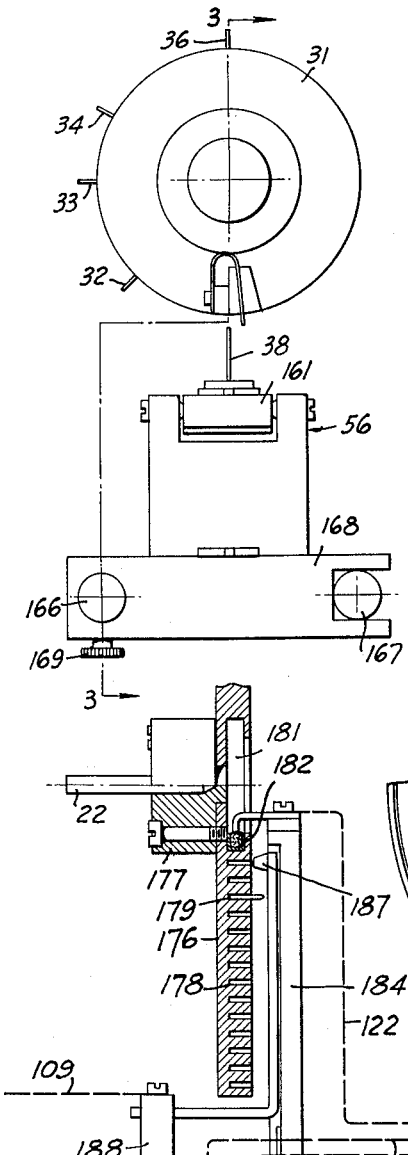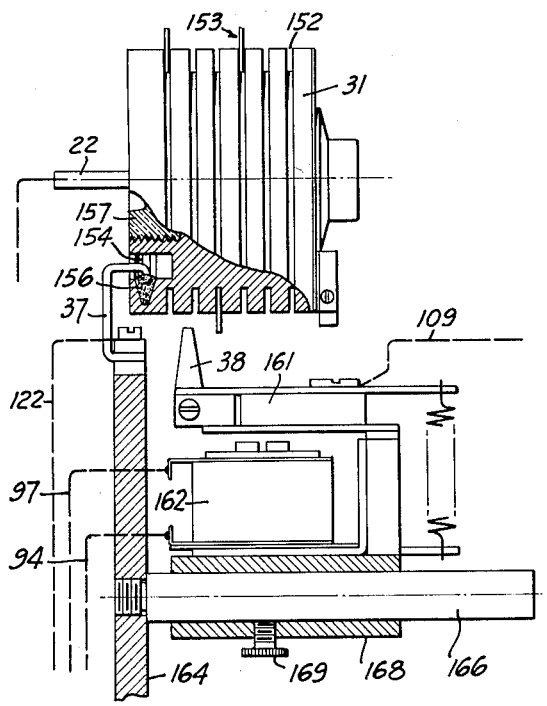

3,077,939
PROGRAM CONTROL SYSTEM AND APPARATUS
Donald B. Turner, Petaluma, Calif., assignor, by mesne assignments, to Foremost Dairies, Inc., San Francisco, Calif., a corporation of New York
Filed May 17, 1954, Ser. No. 430,023
10 Claims. (Cl. 177—70)

This invention relates generally to systems and apparatus for controlling various operations in a predetermined programmed manner. It also pertains to systems and apparatus for batching operations wherein sequential discharge of ingredients into a batch is controlled according to predetermined proportioning.

Various systems and apparatus which have been developed for controlling operations in a predetermined and sequential manner have in general been characterized by objectionable features. In many instances the parts which affect the desired control have been constructed and related in such a manner that they form a part of the equipment, rather than to form a control unit which can be connected in a simple manner with other equipment to perform the desired operations. Frequently the control is such that there is a lack of accuracy in carrying out the various operations. For example, in the control of batching operations, lack of accuracy may be such as to cause a variation in the desired proportioning of ingredients going into various batches. Equipment of this character also lacks flexibility of adjustment, particularly in that it has not been possible to quickly change the equipment for a given programming of sequential operations, as for example, to quickly change the proportioning of ingredients going into a batch.

In general, it is an object of the present invention to provide control apparatus of the above character which is capable of having its principal parts incorporated in a compact assembly, which can be readily connected to various machines or pieces of equipment for controlling and programming operations.

Another object of the invention is to provide apparatus of the above character which will be characterized by relatively high accuracy, and which, for example, when used for controlling batching operations will make possible maintenance of the exact proportions desired.

Another object of the invention is to provide apparatus of the above character which can be readily adjusted to suit different operations desired, and which for example, in the case of controlling batching operations, can be quickly adjusted to change the proportions in different batches.

Another object of the invention is to provide apparatus of the above character wherein false or premature operation is prevented.

Further objects of the invention will appear from the description in which the preferred embodiments of the invention have been set forth in detail in conjunction with the accompanying drawing.

Referring to the drawing:

FIGURES 1A and 1B are a schematic view illustrating a batcher and control system incorporating the present invention.

FIGURE 2 is an elevational view of my position detecting device used in my control system.

FIGURE 3 is a view partly in a cross-section taken along the line 3—3 of FIGURE 2.

FIGURE 4 is an elevational view partly in cross-section of another embodiment of my position detecting device.

FIGURE 5 is a partial elevational view of the assembly used in my position detecting device at right angles to the position shown in FIGURE 4.

In accordance with the present invention I provide apparatus consisting of a series of control relays with circuitry for the same, and which function to operate response devices in a predetermined or programmed manner.

Assuming that the invention is incorporated with additional parts for batching operations, the relays may control the opening and closing of gates or valves which in turn control the flow of ingredients into a common weighing bin. Contact means serve to sense the position of the scale associated with the weighing bin and this sensing means is electrically connected to the relay apparatus, for controlling the closing and opening of the gates sequentially. The relay apparatus includes means which prevent false or premature operation of the gates or valves.

FIGURES 1A and 1B, taken together, illustrate a complete apparatus or system for batching operations. Certain of the mechanical parts are illustrated schematically. The several conduits or chutes 11 are assumed to connect with the lower ends of associated compartments or storage hoppers (not shown), in which various ingredients are stored. Gates 12 which can be of the clamshell type, control discharge of material from the lower ends of these chutes, and are adapted to be operated by suitale motive means, such as the pneumatic operators 13. In this instance only four chutes and gates have been illustrated, for controlling a maximum of four ingredients to be discharged into a batch. It will be understood however that additional ingredients can be controlled, by the provision of additional chutes and control gates.

Disposed below the chutes 11, I have schematically shown a weighing bin 14 provided with clam-shell gates 16 and which is supported by the scale beam 17 fulcrumed at point 18. The scale beam 17 may be attached to scale 19 in any conventional manner such as by a rack 20 engaging a pinion 21 mounted on shaft 22. An indicator 23 is mounted on shaft 22 and rotates with the same.

In addition, I have provided response devices such as pneumatic control valves $V_1$, $V_2$, $V_3$ and $V_4$ which are connected to a suitable supply of regulated air pressure 26. These control valves are adapted to be operated manually or electrically and are pneumatically connected to the pneumatic operators 13.

The control system shown in the circuit diagram of FIGURES 1A and 1B for electrically operating the control valves $V_1$, $V_2$, $V_3$ and $V_4$ is comprised of four normally de-energized main control relays R1, R2, R3 and R4. Associated with these four relays are four normally open thermal relays, T1, T2, T3 and T4, and four single pole double throw switches, S1, S2, S3 and S4. It is desirable that these thermal relays be of the hermetically sealed type similar to the thermal relays manufactured by the Amperite Company, Inc., of New York, New York, under the numbers 115NO3 and 115NO5, which provide time delays of 3 seconds and 5 seconds respectively. However, it is to be understood that these thermal relays can be replaced by time delay relays of the mechanical or pneumatic type such as the model "H" or Agastat relays manufactured by Industrial Timer Corporation.

An additional relay R5 is provided and acts in conjunction with relay R6 and switch S6 to de-energize the control system in a manner hereinafter described. The push-button 27 and a master switch S5 are also utilized in the circuit as hereinafter described.

Associated with the indicator 22 of the scale 19 I have schematically shown in FIGURE 1A my position indicating device comprised of a drum 31 provided with sensing contacts 32, 33, 34 and 36 and slip ring contact 37. The normally de-energized retracting relay R6 is provided with a retractable contact 38 which is adapted to be engaged by the rotating sensing contacts 32, 33, 34 and 36 when the relay R6 is de-energized.

A normally closed mercury switch S6 is mounted on the scale 19 and is adapted to be operated by a magnet 39 carried by the indicator 23.

To act in conjunction with the retracting relay R6, I have provided a time delay means which can be of any suitable type such as the time delay manufactured by the Industrial Timer Corporation of Newark, New Jersey, under model TD–1M which has a 60 second maximum time cycle. Such a device includes a normally open relay R7 which can be energized by a push-button 41, to send a signal to start the spring biased synchronous timing motor 42. After a predetermined interval of time, for example, 1 second, the motor opens contacts 43 which de-energizes the relay R7. This stops the motor and the motor automatically resets itself to its original starting position.

The various relays R1 to R7 have been provided with cooperating sets of back and front contacts which have been designated by lower case letters $a$ to $w$ inclusive as shown in FIGURE 1. The back contacts for relays R1 to R5 and R7 are those contacts which are normally closed and the front contacts are those contacts which are normally open when these relays are de-energized.

The front contacts $a$, $c$, $g$, $k$ and $o$ for relays R1 to R5 may be called the front holding contacts and serve to establish holding circuits for these relays in a manner hereinafter described. The lower sets of contacts $d$, $h$, $l$ and $p$ on relays R2 to R5 may be called the back holding contacts. They are in series with the holding circuits for the relays R1 to R4 and when a specific relay is energized the associated back holding contact serves to de-energize the holding circuit for the preceding relay. The front contacts $b$, $e$, $i$ and $m$ for relays R1 to R4 may be called the front control contacts and serve to establish control circuits for the initial energization of the relays R2 to R5. The back contacts $f$, $j$ and $n$ for relays R2 to R4 may be called the back control contacts. They are in series with the control circuits and serve to prevent operation of more than one relay at a time as hereinafter described.

The various switches S1 to S5 have been provided with contacts which have been designated by the lower case letters $aa$ to $ll$ and are adapted to be engaged by the switch arms of their respective switches.

The circuit diagram shown in FIGURES 1A and 1B for connecting the above relays and switches includes the power supply lines L1 and L2 which may be the standard 110 volts 60 cycle A.C. Line L1 is connected to the switch arm 49 of switch S5 which is adapted to engage stationary contacts $ii$ and $jj$. Conductor 51 is connected from cointact $jj$ to one side of the windings of relays R1 to R5. It is also connected to one side of the heating elements for thermal relays T1 to T4 and to one side of the solenoids of the control valves V1 to V4. Conductor 52 connects contacts $jj$ to conductor 51.

The other sides of the windings of the relays R1 to R4 are connected by conductors 53, 54, 56 and 57 to contacts $aa$, $cc$, $ee$ and $gg$ respectively of switches S1 to S4 inclusive. The other sides of the heating elements for thermal relays T1 to T4 are connected by conductors 58, 59, 61 and 62 to conductors 53, 54, 56 and 57 respectively, and the other sides of the solenoids of the control valves V1 to V4 are also connected to conductors 53, 54, 56 and 57 respectively by conductors 63, 64, 66 and 67.

Line L2 is connected to switch arm 69 of switch S5 which is adapted to engage stationary contacts $kk$ and $ll$. Stationary contacts $ll$ are connected by conductor 71 to one side of push button 27 and the other side of push button 27 is connected by conductor 72 to the switch arm of switch S1. The contacts $bb$ of switch S1 are connected by conductor 73 to the switch arm of switch S2. The contacts $dd$ of switch S2 are connected by conductor 74 to the switch arm of switch S3, and the contacts $ff$ of switch S3 are connected by conductor 76 to the switch arm of switch S4. The contacts $hh$ of switch S4 are connected by conductor 77 to the other side of the winding for relay R5. In addition, the contacts $bb$, $dd$, $ff$ and $hh$ are connected to the stationary contacts of contacts $r$, $s$, $t$ and $u$ by conductors 78, 79, 81 and 82 respectively. The moving contacts of contacts $r$, $s$, $t$ and $u$ are connected by conductors 83, 84, 86 and 87 to the stationary contacts of front control contacts $b$, $e$, $i$ and $m$.

The moving contact of front control contacts $b$ is connected to the stationary contact of back control contacts $f$ by conductor 88. The moving contact of contacts $f$ is connected to the stationary contact of back control contacts $j$ by conductor 89 and the moving contact of contacts $j$ is connected to the stationary contact of back control contacts $n$ by conductor 91. The moving contact of contacts $n$ is connected to one side of the winding of relay R6 by conductor 92, and the other side of the winding of relay R6 is connected to the terminal 93 by conductor 94. Conductor 92 is also connected to terminal 96 by conductor 97.

The front holding contacts $a$, $c$, $g$, and $k$ are connected to conductors 43, 54, 56 and 57 by conductors 99, 101, 102 and 103 respectively. The moving contact of contacts $a$ is connected by conductor 104 to the stationary contact of the back holding contacts $d$, and the moving contact of contacts $d$ is connected to the stationary contact of back holding contacts $h$ by conductor 106. The moving contact of contacts $h$ is connected to the stationary contact of back holding contacts $l$ by conductor 107 and the moving contact of contacts $l$ is connected to the stationary contact of back holding contacts $p$ by conductor 108. The moving contact of contacts $p$ is connected to the retractable contact 38 of relay R6 by conductor 109. Conductor 109 is also connected to the stationary contact of contacts $q$ by conductor 111 and the stationary contact of contacts $q$ is also connected to conductor 71 by conductor 112. The moving contact of contacts $q$ is connected to conductor 92 by conductor 113 and conductor 113 is connected to stationary contact $kk$ of switch S5 by conductor 114.

The stationary contact of contacts $o$ is connected by conductor 116 to one side of switch S6 by conductor 116 and the other side of switch S6 is connected to conductor 77 by conductor 117.

The slip ring contact 37 is connected to terminal 121 by conductor 122. Terminal 123 is connected to conductor 112 by conductor 124 and the terminal 123 is also connected to one side of the push button 41 by conductor 126. The other side of the push button is connected by the conductor 127 to terminal 121. Conductor 127 is connected to one side of the winding of relay R7 by conductor 128 and the other side of the winding is connected to the stationary contact 43 by conductor 129. Terminal 93 is connected to conductor 51 by conductor 131 and conductor 131 is connected to the moving contact of contact 43 by conductor 132. Conductor 133 serves to connect the conductor 131 to one side of the motor 42 and the other side of the motor is connected to conductor 127 by conductor 134.

The stationary contact of contacts $w$ of relay R7 is connected to conductor 128 by conductor 136 and the stationary contact of contacts $v$ is connected to terminal 96 by conductor 137. The moving contacts of contacts $v$ and $w$ are connected to conductor 126 by conductor 138. Conductor 138 is connected to one side of the switch S7 by conductor 139 and the other side of the switch S7 is connected to conductor 137 by conductor 141.

It is desirable to provide pilot lamps 142 which are connected in parallel with the windings of relays R1 to R4 inclusive to give visual indication when these relays are energized. Additional pilot lights 143 may be provided across the stationary contacts $ll$ and $jj$ and $kk$ and

*ii* to indicate whether the master switch is the manual or automatic position as hereinafter described.

Any suitable position detecting means may be used with the above control system and one found to be satisfactory is shown in FIGURES 2 and 3. It consists of a drum 31 which is attached to the shaft 22 and rotates simultaneously with the indicator 23. The drum is provided with a plurality of annular grooves 152 on its outer circumference which are adapted to accommodate a plurality of sensing contacts 153. A particular program has been set up by means of the sensing elements 32, 33, 34 and 36.

The drum 31 is also provided with an inner annular groove 154 which is adapted to contain a pool of mercury 156. The slip ring contact 37 is adapted to engage the pool of mercury 156 and provides continuous electrical contact with the drum 31 with a minimum of friction. It is desirable that the drum 31 be insulated from the shaft 22 by some suitable means such as insulating member 157 which is threaded into drum 31 and mounted on shaft 22.

The relay R6 is associated with the drum 31 and consists of an armature 161 which is actuated by an electromagnet 162 connected to lines 94 and 97. The retractable contact 38 is carried by the armature 161 and is adapted to engage predetermined sensing contacts 153. The slip ring contact 37 is connected to line 122 and the retractable contact 38 is connected to line 109 as previously described.

The relay R6 may be supported upon the scale by any suitable means and one found to be satisfactory consists of a mounting block 164 attached to the scale 19. A pair of cylindrical rods 166 and 167 are threaded into mounting block 164 and extend perpendicularly therefrom and are adapted to slidably carry the base 168. The relay R6 is suitably attached to base 168 which can be fixed in any predetermined position on the rods 166 and 168 by means of thumb screw 169. It will be apparent that the above slidable mounting will permit the retractable contact 38 to be positioned so that it will be in alignment with any one of the annular grooves 152 on drum 31 for a purpose hereinafter described.

Another embodiment of my position detecting device is shown in FIGURES 4 and 5. This embodiment consists of a circular disc 176 which is attached to and insulated from shaft 22 by means of insulating block 177. One face of the disc is provided with a plurality of concentric grooves 178 which are adapted to accommodate a plurality of contact lugs 179 in a manner similar to the way in which drum 31 accommodates contact lugs 153. The disc 176 is also provided with an annular groove 181 which is adapted to contain a mercury pool 182. Slip ring contact 183 is adapted to engage this pool of mercury and is supported by an arm 184 mounted on the base 186 for the relay R6.

The relay R6 associated with the disc 176 is similar to the relay R6 shown in FIGURES 2 and 3 and consists generally of a retractable contact 187 carried by the armature 188 and electrically connected to conductor 109. The electromagnet 189 is suitably mounted on the base 186 and is electrically connected to conductors 94 and 97. Suitable means (not shown) similar to those shown in FIGURES 2 and 3 may be used for positioning the retractable contact 187 so that it may be aligned with any one of the concentric grooves 178 in disc 176.

It is apparent that this embodiment of my positioning device can be used to accomplish the same purpose as the positioning device shown in FIGURES 2 and 3 as will be hereinafter described.

Operation of my control system in conjunction with a batching operation can now be reviewed as follows: Assuming that automatic operation is desired and that a pre-selected program has been set up on the drum 31, as illustrated by sensing contacts 32, 33, 34 and 36, the operation of the control system is as follows.

The main master switch S5 is thrown to the right as viewed in FIGURE 1B to bring switch arm 49 in contact with contacts *jj* and switch arm 69 in contact with contacts *ll*. This operation places the control system in readiness for operation by means of push button 27. Assuming that it is desired to use four ingredients in the batch, switches S1 to S4 are thrown to the left as viewed in FIGURE 1, however, if it is desired to omit a certain ingredient, it is merely necessary to throw the respective switch involved to the right.

Operation of the push button 27 causes the following sequence of operations to take place. Relay R1 and thermal relay T1 are immediately energized. This circuit can be traced from line L1 to switch arm 49, contact *jj*, line 51, the windings of relay R1, conductor 53, switch S1, conductor 72, push button 27, conductor 71, contact *ll* and switch arm 69 of switch S5 back to line L2. The heating element of thermal relay T1 and the associated pilot lamp 142 are energized because they are connected in parallel with the winding of relay R1. Contacts *r* of relay T1 then close after a predetermined interval.

Operation of the relay R1 closes contacts *a* and *b*. Closing of contacts *a* energizes a holding circuit for relay R1 and maintains it energized even though push button 27 is released. This holding circuit can be traced from the winding of relay R1 to conductor 99, contacts *a*, conductor 104, contacts *d*, conductor 106, contacts *h*, conductor 107, contacts *l*, conductors 108, contacts *p* through conductors 111 and 112 to line L2.

Simultaneously with the closing of relay R1, control valve V1 is operated to open the gate of its associated chute 11 by means of its pneumatic operator 13. The ingredient in this chute then flows into weighing bin 14 causing the indicator 23 of the scale 19 and the drum 31 to start rotating in a clockwise direction. The gate is held open and the flow of the ingredient continues until contact 32 engages the movable contact 38. Engagement of the contacts 32 and 38 initiates operation of the timer. This circuit can be traced from L2, conductors 71, 112, 111, 109, contact 38, contact 32, slip ring contact 37, conductor 122, terminal 121, conductor 127, conductor 128, the winding of relay R7, conductor 129, contacts 43, conductor 132, conductor 131, and conductor 51 to line L1.

At the same time relay R7 is energized the synchronous motor 42 is energized because it is connected in parallel with the winding of relay R7 by conductors 133 and 134. Closing of contacts *v* on relay R7 immediately energizes the winding of relay R6 to retract contact 38 to allow continued rotation of drum 31 and contact 32. Thus, immediately after contact 32 has engaged contact 38, contact 38 is immediately retracted allowing contact 32 to continue its rotary motion without inducing any drag, friction or resistance upon the drum 31.

The circuit for energizing the winding of relay R6 can be traced from the line L1, conductor 51, conductor 131, terminal 93, conductor 94, the winding of relay R6, conductor 97, terminal 96, conductor 137, contacts *v*, conductor 138, conductor 124 and conductor 112 to line L2.

The closing of contacts *w* on relay R7 serves to energize a holding circuit for relay R7 through conductor 136. Thus, it is apparent that the relay R7 will remain energized after contact 38 is retracted from contact 32.

At the same time that the relay R6 is energized, relay R2 is energized. This circuit can be traced from line L1, conductor 51, the winding of relay R2, conductor 54, switch S2, conductor 73, contact *bb*, conductor 78, contacts *r* (closed by action of the heating element of thermal relay T1 as hereinafter described), conductor 83, contacts *b*, line 88, contacts *f*, conductor 89, contacts *j*, conductor 91, contacts *n*, conductor 92, conductor 97, terminal 96, conductor 137, contacts *v*, conductor 138, conductor 124 and through conductor 112 to line L2.

Energization of the relay R2 closes contacts c and e and opens contacts d and f. Opening of the contacts d de-energizes the holding circuit for relay R1 which in turn de-energizes the solenoid on the control valve V1 to close its respective gate 12 to stop flow of the ingredient from the hopper. Thus the flow of the ingredient will be cut off at substantially the same instant that contact 32 engages contact 38. The de-energization of the relay R1 opens contacts a and b. The heating element for the thermal relay T1 is also de-energized and after a predetermined interval, the contacts r are opened.

Closure of contacts c energizes the holding circuit for relay R2 in a manner similar to the way in which the holding circuit for relay R1 was energized. At the same time the relay R2 is energized, the heating element for thermal relay T2 is energized and so is the respective pilot lamp 142 because they are connected in parallel with the winding of relay R2. Also simultaneously with the energization of relay R2, the control valve V2 is operated to open its respective chute 11 to allow that ingredient to flow into the weighing bin 14. Thus as soon as V1 is de-energized, V2 is energized and therefore the indicator 23 and drum 31 will continue to rotate causing sensing contacts 33 to engage contact 38.

However, before contact 33 comes into engagement with contact 38 the timing motor 42 must operate to open contacts 43. Normally the motor 42 would be set to open the contacts 43 after a predetermined time interval such as 1 or 2 seconds. Opening of contacts 43 serves to de-energize the winding of relay R7 causing contacts v and w to open. The opening of contacts v de-energizes the winding of relay R6 allowing the contact 38 to return to its normal contact engaging position. The relay R6 is energized for this predetermined interval of time every time it is engaged by a sensing contact in order to allow the sensing contacts to pass the retractable contact 38 without hunting. It is apparent that the contact 38 must be released in sufficient time so that it will be in position to be engaged by the next following sensing contact which in this instance would be contact 33.

When contact 33 engages contact 38, the same sequence of operation will take place as described when contact 32 engaged contact 38. The control valve V2 will be de-energized to close its respective gate 12 and control valve V3 will be energized to open its respective gate. Contact 38 will be retracted again to allow contact 33 to pass and allow drum 31 to continue its rotation responsive to the weight of the next ingredient flowing into the weighing bin 14. Retractable contact 38 will be released again in sufficient time to allow its engagement with sensing contact 34. Engagement of contact 34 with contact 38 causes the de-energization of control valve V3 to close its respective gate and the energization of control valve V4 to open its respective gate. Contact 38 is again retracted and then released so that it may engage sensing contact 36. Engagement of contact 36 with contact 38 again causes operation of relay R7 which in turn causes energization of relay R6 to retract the contact 38.

At this time the cancelling relay R5 is energized. This circuit can be traced from line L1, conductor 51, the winding of relay R5, conductor 77, contact hh, conductor 82, contacts u, conductor 87, contacts m, conductor 92, conductor 97, conductor 137, contacts v, conductor 138, conductor 124, conductor 112 to line L2. Operation of relay R5 opens contacts p and closes contacts o and q. Opening of contacts p de-energizes the holding circuit for relay R4 which in turn de-energizes control valve V4 to complete the flow of ingredients into weighing bin 14.

The closure of contacts o serves to energize a holding circuit for relay R5. This circuit can be traced from line L1 to conductor 51, the winding of relay R5, conductor 77, conductor 117, to the normally closed mercury switch S6, conductor 116, contacts o, conductor 111, conductor 112, to line L2. The closure of contacts q serves to maintain a relay R6 energized even though relay R7 may be de-energized by operation of motor 42.

At this time, the gates 16 of the weighing bin 14 may be opened because all of the ingredients have been placed in the weighing bin in proper proportions. They may be operated by manually operated means or means may be provided for automatically opening these gates by electrically connecting them to relay R5 so that they are opened when this relay is energized.

On opening of gates 16, the weighing bin 14 will be emptied causing the indicator 23 to rotate in a counter-clockwise direction and gradually return to zero. During this return movement, it is important that the contact 38 remain retracted so that it will not be engaged by sensing contacts 32, 33, 34 and 36. As previously mentioned, this is accomplished by contacts q of relay R5. As soon as the indicator 23 has reached zero, the magnet 39 serves to open the normally closed mercury switch S6. The opening of switch S6 de-energizes the holding circuit for cancelling relay R5. De-energization of relay R5 opens contacts o and q. At this time the entire control system has been returned to the condition that it is shown in FIGURE 1 and is in position to be reenergized by push button 27 to start another complete cycle.

Manual operation, de-activating the entire control system, can be obtained merely by switching the switch arms 49 and 69 to the left as viewed in FIGURE 1. In this position the relay R6 is continually energized maintaining the contact 38 in a retracted position so that it will not be engaged by sensing contacts 32, 33, 34 and 36. This circuit can be traced from line L1, conductor 51, conductor 131, terminal 93, conductor 94, the winding of relay R6, conductor 97, conductor 92, conductor 114, to line L2. In this position the control valves V1 to V4 may be manually operated to control the operation of gates 12.

It is apparent that under automatic operation that any one or more of the ingredients from the storage hoppers 11 can be eliminated if desired merely by moving the appropriate switch or switches S1, S2, S3 or S4 to the right hand position, as viewed in FIGURE 1. For example, if it is desired to eliminate the ingredient in the storage hopper associated with switch S2, it is merely necessary to swing switch S2 to the right whereupon the control signal coming from the timer by-passes relay R2 and actuates relay R3. In this manner, one or more ingredients may be eliminated if desired.

With the use of push button 41, semi-automatic operation can be accomplished. Relay R6 is positioned so that the retractable contact 38 cannot be engaged by the sensing contacts. Then by operating push button 27, the opening and closing of the gates 12 is accomplished by operation of push button 41 which is actuated as the indicator 23 passes the desired cut-off point. Accuracy is dependent upon the skill of the operator and hence this type of operation is not to be used except in an emergency.

Switch S7 is only used for testing purposes and is normally open as shown. When closed it will feed a continuous signal to the control relays and the control relays will be energized in sequence at time intervals determined by thermal relays T1 to T4. When doing this testing it is desirable to disconnect the control valves V1 to V4 from the electrical circuit.

The thermal relays T1 to T4 have been included in the control circuits in order to prevent premature operation of control relays R2 to R5. As previously explained, the thermal relays are normally open and are set to close at predetermined time intervals, the interval of time being dependent upon the time it takes for that particular ingredient to flow into the weighing bin. Normally, this would be a time interval ranging from 3 to 5 seconds. It is apparent that this time interval for the particular thermal relay involved must be less than the time required to traverse the arc between the preceding sensing contact on drum 31 and the next succeeding sensing contact in order that the control circuit will be in condition to receive the next control signal to energize the succeeding control relay. Before the thermal relay closes, no false signals can be communicated to the succeeding control relay to cause premature operation of this relay. For example, assuming that relay R2 has been energized and that contacts *s* of thermal relay T2 are closed after 3 seconds, no control signal can be sent to relay R3 before the 3 seconds have elapsed. A 3 second time delay has been used under the assumption that it will take at least 3 or more seconds for the drum 31 to rotate from the position where sensing contact 32 engages retractable contact 38 to the position where sensing contact 33 engages retractable contact 38. In this manner, relay R3 is prevented from premature operation during the 3 second interval and still relay R3 will be in condition to receive the next control signal.

The back and front control contacts on the control relays have been provided so that the control relays are energized in the proper sequence and so that only one control relay can be energized at any one time. For example, assuming that relay R2 has been energized, the front control contacts *e* are closed and the back control contacts *d* are opened. Thus when a control signal comes from conductor 92, it will pass through back control contacts *n*, conductor 91, back control contacts *j*, conductor 89, front control contacts *e*, conductor 84, contacts *s*, and conductor 56 to energize relay R3. The control signal cannot pass to relay R2 because the back control contacts *f* are open and relays R4 and R5 cannot be energized because the front control contacts *i* and *m* are open.

As soon as relay R3 is energized, the front control contacts *i* are closed and the back control contacts *j* are opened, thus conditioning the control circuit so that the next control signal will energize relay R4. From this it can be seen that the various control signals will energize the control relays in the proper sequence and that only one control relay can be energized at one time.

The front and back holding contacts have been arranged in the holding circuit so that when one relay is energized, its holding circuit is established and the holding circuit on the preceding relay is de-energized. Thus when relay R3 is energized, the front holding contact *g* is closed and the back holding contact *h* is opened. The opening of back contact *h* interrupts the holding circuit for relay R2 to cause its de-energization.

By means of the position detecting device shown in FIGURES 2 and 3, it is possible to set up a predetermined program of different types of batches with different proportions of ingredients. Using each groove 152 for a different type of batch, the drum 31 as shown in FIGURE 3 can be used to set up six different types of batches. If a greater number of combinations are desired, it is merely necessary to increase the number of grooves 152 in the drum 31.

To set up a specific type of batch, it is merely necessary to insert a plurality of sensing contacts 153 in the grooves 152 at spaced intervals corresponding to the proportions desired in the batch. For example, four sensing contacts can be spaced on the drum 31 as shown in the schematic diagram of FIGURE 1 by contacts 32, 33, 34 and 36. Upon rotation of the shaft 22 the contacts 32, 33, 34 and 36 will engage retractable contact 38 at predetermined intervals and thus will serve to control the amount of each of the ingredients which flows from each of the chutes 11. The other grooves in the drum 31 can be fitted wtih spaced sensing contacts in the same manner so that different type of batches are represented by each groove. The type of batch desired can be selected merely by loosening the thumb screw 169 and sliding the base 168 longitudinally along the rods 166 and 167 until the retractable contact 38 is in alignment with the proper groove 152.

As previously explained, when a sensing contact energizes contact 38, the electromagnet 162 is immediately energized, retracting contact 38 and allowing the contact lug to pass and continue its rotary motion without imparting any drag or friction to the drum 31. The contact 38 is maintained in this retracted position for a suitable period of time such as one second so that the contact lug will have a sufficient time to pass. The magnet 162 is then de-energized allowing contact 38 to return to its normal position.

The above position detecting device together with the control system causes automatic selection of the proper ingredients in the proper proportions as arranged on a preselected program on drum 31.

A similar pre-selected program can be set up on disc 176 in the embodiment of my position detecting means shown in FIGURES 4 and 5.

The programming means herein shown has been devised for a single scale beam but similar programming means can be used for multiple scale beams so that a similar control system can be used.

It will be apparent from the foregoing that I have provided an automatic control system for batching operations which is capable of selecting and accurately proportioning the ingredients for different batches according to a predetermined program. The electrical control system has been incorporated into a compact assembly with few electrical connections to the mechanical structure and hence makes possible the use of a much simpler mechanical structure. For example, it is merely necessary to run a pair of lines to each of the control valves V1 to V4.

Thermal relays have been provided to prevent false or premature operation of the control relays. The position detecting device has been provided to allow predetermined programming of different types of batches with various proportions of ingredients and which through the control system will accurately select and maintain the desired proportions of ingredients flowing into a particular batch.

As previously indicated various features of the present invention can be used with apparatus or systems other than apparatus for batching operations. For example, it can be used in chemical plants for controlling the operation of valves and like devices, whereby a plant processing cycle is controlled automatically or semi-automatically. Likewise it can be used for machine control where operations such as the starting and stopping of the machine, and the feeding and discharge of objects with respect to the same, are to be carried out sequentially in accordance with a predetermined program.

I claim:

1. In an apparatus of the character described, a weighing bin, a plurality of flow control devices adapted to be separately controlled for discharging ingredients into said bin, scale means responsive to the weight of the ingredients within said bin, and means connected to said scale means for sequentially operating said flow control devices, said last named means including relay means associated with the said flow control devices, circuitry connecting said relay means to secure sequential operation of the same responsive to successive application of control pulses, said means connected to said scale means also including a plurality of sensing contacts mounted on said scale means, a retractable contact movable between a normal position in the path of said sensing contacts and a retracted position out of the path of said contacts, circuit means connecting said sensing and retractable contacts to the relay circuitry to apply a control pulse to the relay circuitry each time said retractable contact engages a sensing contact, means responsive to engagement of said retractable contact with a sensing contact for moving said retractable contact to said retracted position to terminate the control pulse, time delay means for permitting said retractable contact to return to its normal position from a retracted position after a predetermined interval of time, the relay circuitry including a starting circuit for energizing the first relay in the series, holding circuit means connected to said relays whereby each of said relays is maintained in energized condition for a predetermined interval of time after energization of same, the holding circuit for each of the relays being energized upon the energization of the succeeding relay in the series, control circuit means connected to said relays whereby only one of said relays in the series may be energized by a single control pulse, the control pulse serving to energize the remaining relays in the series after the first relay has been energized by the starting circuit, the control circuit being connetced so that the control circuit for the next succeeding relay is conditioned for the receipt of a control pulse on energization of the preceding relay by a control pulse and the control circuit to the preceding relay is conditioned so that the preceding relay cannot be energized by the next control pulse, means for deenergizing the holding circuit on the last relay of said series after energization of the last relay in the series, and means for returning the apparatus to its initial position.

2. In a control apparatus of the character described, a weighing bin, a plurality of flow control devices adapted to be separately controlled for discharging ingredients into said bin, scale means responsive to the weight of the ingredients within said bin, and means controlled by said scale means to automatically control said flow control devices, said last named means including a plurality of relays, position detecting means mounted on the scale means for producing a plurality of control pulses, circuitry connecting said relays to said position detecting means to secure sequential operation of the relays responsive to the application of control pulses by said position detecting means and means connecting said relays to said flow control devices whereby as said relays are sequentially operated said flow control devices are sequentially operated, said position detecting means including a plurality of sensing contacts mounted on said scale means, a retractable contact movable between a normal position in the path of said sensing contacts and to a retracted position out of the path of said sensing contacts, circuit means connecting said sensing contacts and said retractable contact to cause the application of a control pulse to the relay circuitry each time a sensing contact engages the retractable contact, and means responsive to the engagement of the retractable contact by a sensing contact to move said retractable contact to said retracted position to permit the movement of the sensing contact that has engaged the retractable contact past the retractable contact.

3. Control apparatus as in claim 2 wherein said last named means includes time delay means for retaining said retractable contact in a retracted position for a predetermined period of time.

4. In control apparatus of the character described, a weighing bin, a plurality of flow control devices adapted to be separately controlled for discharging ingredients into said bin, scale means responsive to the weight of the ingredients within the same, and means controlled by the scale means to automatically control said flow control devices, said last named means including position detecting means rotatably mounted on said scale means to produce a series of pulses, a plurality of relays, circuitry connecting said relays to said position detecting means to secure sequential operation of the relays responsive to the successive application of control pulses from said position detecting means, and the means connecting said relays to said flow control devices whereby said relays are sequentially operated, said position detecting means including a rotatable member mounted upon said scale means and adapted to be rotated by said scale means responsive to the weight of the ingredients within the weighing bin, a plurality of sensing contacts carried by the rotatable member, a retractable contact movable between a normal position in the path of said sensing contacts and a retracted position out of the path of said sensing contacts, circuitry connecting said sensing contacts to said retractable contact whereby a control pulse is applied to the relay circuitry each time a sensing contact engages the retractable contact, and means to move said retractable contact to said retracted position for a predeterimned interval of time each time it is engaged by one of said sensing contacts to permit the sensing contact to pass the retractable contact.

5. A control apparatus as in claim 4 wherein the sensing contacts are spaced in a single arcuate row in accordance with the proportions in a batch to be weighed into the weighing bin.

6. In a control system of the character described, a series of response devices adapted to be sequentially energized, a series of relays connected to each of said response devices to actuate the same, a starting circuit adapted when closed to energize the first relay in the series, holding circuit means connected to each of said relays whereby each of said relays is maintained in an energized condition for a predetermined interval of time after energization of the same, the holding circuit for each of the relays being energized upon energization of its respective relay and being de-energized upon energization of the next succeeding relay in the series, control circuit means connected to each of said relays, means for applying control pulses at predetermined intervals to said control circuit means, said control pulses serving to energize the remaining relays in the series one at a time and in sequence after said first relay has been energized, said control circuit being connected to said relays so that the control circuit to the succeeding relay is closed upon energization of the preceding relay to cause the next control pulse to energize the next relay in the series and so that the control circuit to the preceding relay is opened to prevent energization of the preceding relay by the next control pulse, and means for de-energizing the holding circuit on the last relay of said series of relays after energization of said last relay.

7. In a control apparatus of the character described, a series of response devices adapted to be sequentially energized, a series of relays connected to said response devices to actuate the same, a starting circuit adapted when closed to energize the first relay in the series, holding circuit means connected to said series of relays whereby each of said relays is maintained in an energized condition for a predetermined length of time, the holding circuit of each of said relays being energized upon energization of its respective relay and being de-energized upon energization of the next succeeding relay in the series, said holding circuit means including front holding contacts for the first relay and front and back holding contacts for the remaining relays in the series, control circuit means connected to said relays, means to apply control pulses in sequence at predetermined intervals to control circuit means, said control pulses serving to energize the remaining relays in sequence after said first relay has been energized by said starting circuit, said control circuit being connected so that the control circuit for the next succeeding relay is conditioned for the receipt of a control pulse upon energization of the preceding relay in the control circuit so that the preceding relay is opened whereby the relays are energized in sequence and only one relay is energized from one control pulse, said control circuit means including front control contacts on said first relay and front and back control contacts on the remainder of said relays, and means to de-energize the holding circuit on the last relay of the series after energization of the last relay.

8. Control apparatus as in claim 7 together with time delay means connected in the relay circuitry to prevent operation of the next succeeding relay by a pulse within a predetermined interval of time after energization of the preceding relay.

9. Control apparatus as in claim 8 wherein said last named time delay means includes thermal delay means connected to each of said relays except the last relay in the series, each of said thermal relays being adapted to condition the control circuit for the succeeding relay to receive a control pulse a predetermined interval after energization of the preceding relay, each of said thermal delay means being energized at the time the relay it is connected to is energized.

10. In a control mechanism for use with a weighing scale having a source of supply, together with means for cutting off flow of material onto the scale from the source of supply, the combination comprising a movable weight responsive member arranged for connection to the scale for movement progressively in response to continued discharge of material onto said scale, a first electrical contact coupled to the weight responsive member for movement therewith, a second electrical contact spaced from and arranged in the path of movement of the first contact, retraction means operatively connected with said second electrical contact and energizable by the engagement of said second electrical contact with said first electrical contact to move said second electrical contact out of the path of movement of said first contact, and means including a control circuit responsive to engagement of the contacts for simultaneously cutting off flow of material onto said scale and for energizing said retraction means.

References Cited in the file of this patent

UNITED STATES PATENTS

| | | |
|---|---|---|
| 1,826,919 | Bliss | Oct. 13, 1931 |
| 1,904,929 | Richardson | Apr. 18, 1933 |
| 2,047,122 | Brandenburger | July 7, 1936 |
| 2,050,720 | McLure | Aug. 11, 1936 |
| 2,118,424 | Watanabe | May 24, 1938 |
| 2,155,304 | Corey | Apr. 18, 1939 |
| 2,793,000 | Klein et al. | May 21, 1957 |